(12) United States Patent
Ying et al.

(10) Patent No.: US 7,808,974 B2
(45) Date of Patent: Oct. 5, 2010

(54) METHOD AND APPARATUS FOR VOICE OVER INTERNET PROTOCOL TELEPHONY USING A VIRTUAL PRIVATE NETWORK

(75) Inventors: Goangshiuan Shawn Ying, Oakland, CA (US); Eugene L. Edmon, Danville, CA (US); Carlton L. Brown, Danville, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 521 days.

(21) Appl. No.: 10/465,032

(22) Filed: Jun. 19, 2003

(65) Prior Publication Data

US 2004/0260747 A1     Dec. 23, 2004

(51) Int. Cl.
*H04L 12/66* (2006.01)
(52) U.S. Cl. .................................... 370/352; 379/88.17
(58) Field of Classification Search ................. 370/351, 370/352–356, 88.17; 379/220.01, 229, 93.01, 379/93.17, 88.17
See application file for complete search history.

(56) References Cited

U.S. PATENT DOCUMENTS

| | | | | |
|---|---|---|---|---|
| 5,006,976 A * | 4/1991 | Jundt | ........................... | 700/79 |
| 5,008,927 A * | 4/1991 | Weiss et al. | ............. | 379/110.01 |
| 5,555,241 A * | 9/1996 | Lazaridis et al. | ............. | 370/389 |
| 6,519,242 B1 | 2/2003 | Emery et al. | ................ | 370/338 |
| 6,577,642 B1 * | 6/2003 | Fijolek et al. | ............... | 370/465 |
| 6,633,905 B1 * | 10/2003 | Anderson et al. | ........... | 709/219 |
| 6,647,109 B1 | 11/2003 | Henderson | | |
| 6,781,955 B2 * | 8/2004 | Leung | ........................ | 370/232 |
| 6,873,988 B2 * | 3/2005 | Herrmann et al. | ............. | 707/10 |
| 7,016,334 B2 * | 3/2006 | Cohen et al. | ................ | 370/338 |
| 7,023,989 B1 * | 4/2006 | Turner et al. | ................ | 709/220 |
| 7,062,032 B1 * | 6/2006 | Bloom et al. | .......... | 379/265.04 |
| 7,079,647 B2 * | 7/2006 | Tomobe | ....................... | 379/413 |
| 7,283,808 B2 * | 10/2007 | Castell et al. | ................ | 455/413 |
| 7,287,252 B2 * | 10/2007 | Bussiere et al. | ............. | 717/176 |
| 7,565,115 B2 * | 7/2009 | Alexis | ........................ | 455/74.1 |
| 2002/0009188 A1 * | 1/2002 | Rosset et al. | ............ | 379/221.15 |
| 2002/0075844 A1 * | 6/2002 | Hagen | ........................ | 370/351 |

(Continued)

OTHER PUBLICATIONS

"Asante/SMC Router Help—VPN Setup"; www.practical-lynetworked.com/support/asante_smc_vpn.htm; pp. 1-4; Oct. 9, 2003.

(Continued)

*Primary Examiner*—Simon Sing
(74) *Attorney, Agent, or Firm*—Toler Law Group

(57) ABSTRACT

An apparatus and methods for utilizing a Voice over Internet Protocol (VoIP) telephone with a built-in VPN client is disclosed. A VoIP telephone with an internal VPN client module incorporated into the VoIP telephone establishes a VPN tunnel directly from the VoIP telephone VPN client to an IP-PBX network access point. A VPN session, established in response to keypad input from a user of the VoIP telephone, is conducted over the VPN tunnel to a remote location. In a disclosed method, a secured VoIP telephone communication link is established by receiving a request from a user of the VoIP telephone, processing the request, and sending a signal from the VoIP telephone unit's VPN client over a data interface to a remote location. After exchange of authentication messages between the VoIP telephone VPN client and a remote location's VPN server, a VPN session is established.

15 Claims, 6 Drawing Sheets

U.S. PATENT DOCUMENTS

| | | | |
|---|---|---|---|
| 2002/0099826 A1 | 7/2002 | Summers et al. | |
| 2002/0118671 A1* | 8/2002 | Staples et al. | 370/352 |
| 2002/0141352 A1 | 10/2002 | Fangman et al. | 370/352 |
| 2002/0141389 A1 | 10/2002 | Fangman et al. | 370/352 |
| 2002/0141390 A1 | 10/2002 | Fangman et al. | 370/352 |
| 2002/0150083 A1 | 10/2002 | Fangman et al. | 370/352 |
| 2003/0041136 A1 | 2/2003 | Cheline et al. | |
| 2003/0055990 A1 | 3/2003 | Cheline et al. | |
| 2003/0128696 A1 | 7/2003 | Wengrovitz et al. | |
| 2003/0140131 A1 | 7/2003 | Chandrashekhar et al. | |
| 2003/0152068 A1* | 8/2003 | Balasaygun et al. | 379/88.17 |
| 2003/0200321 A1 | 10/2003 | Chen et al. | |
| 2004/0068668 A1* | 4/2004 | Lor et al. | 713/201 |
| 2004/0223464 A1* | 11/2004 | Dye et al. | 370/352 |
| 2005/0021766 A1* | 1/2005 | McKeowen et al. | 709/228 |
| 2005/0227670 A1 | 10/2005 | Bicker | |

OTHER PUBLICATIONS

Netlock VPN Client for Cisco Data Sheet [pdf]; Netlock Technologies, Inc.; pp. 1-3; Copyright 2003.

IETF Internet Draft Document "Mobile IPv6 VPN Using Gateway Home Agent"; expires Apr. 2002.

The Power Behind RSA SecurID Two-factor User Authentication: RSA ACE/Server, RSA Security Inc., 16 pages, Feb. 1, 2004.

RSA SecurID, Tokens, RSA Security Inc., http://www.rsasecurity.com/products/securid/tokens.html, Jan. 30, 2004, 2 pages.

"Sipura Technology, Inc., Sipura Phone Adapters,"http://www.sipura.com/products/spa2000.htm, Jun. 27, 2006, 6 pages.

Panasonic Hybrid IP-PBX User Manual, 2003 Panasonic Communications Co., Ltd., 162 pages.

Panasonic Ideas for Life, Communication Systems, Marketing memo, Mar. 28, 2006, 5 pages.

Spitfire News, "ISDN 30 Launched," Summer 2003, 9 pages.

Panasonic Ideas for Life, KX-TDA, "The advanced hybrid IP-PBX solution," Feb. 2005, 12 pages.

TallyCostLtd, KX-TDA 100/200, "Hybrid IP PBX System Up to 64 Extensions, KX-TDA 200, Hybrid IP PBX System up to 128 Extensions," http://www.tallycost.com/prod4.htm, Jan. 8, 2004, 9 sheets.

Intertex, IX66 Broadband Access Router with ADSL Modem—Advanced Models, http://www.intertex.se/products/detail.asp?ProductID=52, Jun. 27, 2006, 14 pages.

"Panasonic: Advanced Hyrid IP-PBX Solutions, Westlake Communications, The Complete Guide to Panasonic Systems 2006," 24 pages.

KX-TDA100 KX-TDA200, Digital Hybrid IP-PBX System, Panasonic Ideas for life, Feb. 2005, 17 pages.

"TallyCostLtd, KX-TDA 100/200, Panasonic KX-TDA Range," printed from the Internet: http://web.archive.org/web/20040604181554/http://www.tallycost.com/..., last modified Jan. 8, 2004, 9 pages.

* cited by examiner

METHOD AND APPARATUS FOR VOICE OVER INTERNET PROTOCOL TELEPHONY USING A VIRTUAL PRIVATE NETWORK

FIELD OF THE DISCLOSURE

The present disclosure relates generally to Voice over Internet Protocol (VoIP) telephony, and specifically to a VoIP telephone with a virtual private network (VPN) client incorporated into the VoIP telephone.

DESCRIPTION OF THE RELATED ART

Until the widespread deployment of broadband access, e.g., xDSL and/or cable modems, dial-up with an analog modem to a remote access server (RAS) located at a corporate site had been a commonly employed method to gain secured computer access from a remote site such as a telecommuter's premises. However, with broadband access, telecommuters have been utilizing their broadband link to the public Internet protocol (IP) network to access their employer's servers and data. The use of virtual private network (VPN) communications is increasing in response to the desire for data security when telecommuting employees access their employer's local area network (LAN) or data networks.

Access to an employer's VPN server generally requires the telecommuter to use a personal computer (PC) with a VPN client, or software routine, that is installed and configured to establish a VPN tunnel from the telecommuter's PC to the employer's network. A VPN tunnel may be established using a base architecture for Internet protocol security (IPSec) compliant systems, as presented in Request for Comments (RFC) 2401, Security Architecture for the Internet Protocol, dated November 1998.

When working at home, if the telecommuter has a portable computer with a VPN client installed, the telecommuter is still able to initiate a VPN session with the portable computer if an alternate broadband access source is provided, e.g., telecommuter's subscription of ADSL or Cable Modem. However, this option is not presently available if the traveling telecommuter wishes to use his IP telephone away from work. Telecommuters must often resort to using cellular telephones or home telephones, which may be paid for using a corporate phone card or personal expenses on long-distance calls. Such connections with required payment fees are inconvenient for mobile employees.

Accordingly, a need exists for an IP telephone that is capable of providing a direct and secured VPN link between the IP telephone set and a corporate network.

SUMMARY

In a particular embodiment, a method is presented for establishing a communication link using a Voice over Internet Protocol (VoIP) telephone with IP-VPN client software installed in the VoIP telephone. The method includes establishing a VPN tunnel directly from a VPN client incorporated into a VoIP telephone to an Internet protocol public branch exchange (IP-PBX) network access point. A VoIP connection is established between the VoIP telephone and a gateway, and a VPN session is conducted using the VoIP telephone. This connection can be established in response to a user request, e.g., via a keypad entry. When the need for communications is no longer present, the VPN session can be concluded at the request of the user. Alternately, the request to conclude a VPN session can be made by the VPN server at the remote location, e.g., the IP-PBX network.

In a particular embodiment, the VoIP telephone apparatus includes an encoder and decoder module responsive to a handset of the VoIP telephone apparatus, as well as a data processor responsive to the encoder and decoder module, a VPN client module responsive to the data processor, and a keypad responsive to user input. The VoIP telephone apparatus may also include a visual display window responsive to the VPN client and responsive to user input. The visual display window displays a current status of a VPN session.

In a further embodiment, a method for establishing a VoIP telephone communication link is presented. The method includes activating a VoIP telephone, initializing a VPN client within the VoIP telephone, and negotiating a VPN session between the VoIP telephone VPN client and a VPN server at a remote location. In a particular embodiment, negotiating the VPN session includes sending a first authentication message from the VoIP telephone VPN client to the remote VPN server. A second authentication message from the remote VPN server is received at the VoIP VPN client. The VPN tunnel is then established for data communication in response to receiving the second authentication. Once established, the VPN session may be conducted. In a particular embodiment, the VPN session is initiated by a keypad input by a user.

In a particular embodiment, a method for establishing a VoIP telephone communication link is presented. The method includes receiving a request from a user of a VoIP telephone having an internal VPN client to place a secure telephone call. The request is processed, a signal is sent from the VoIP internal VPN client over a data interface to a remote location, and a VPN session is established in response to the request. In a particular embodiment, the internal VPN client is an IPSec-based client.

In a further embodiment, a method of communicating between a remote network location and a VoIP telephone unit is presented. The method includes receiving a signal from the VoIP telephone unit VPN client at the remote network location. A secure connection is established between a VPN server at the remote network location and the VPN client in the VoIP telephone.

In another embodiment, a VPN server is presented. The VPN server includes a first interface to receive a signal at a network location from a remote VPN client disposed in a VoIP telephone unit. In addition, the VPN server includes a second interface to establish a secure connection with the remote VPN client. In a further embodiment, a virtual private network (VPN) tunnel is presented. The VPN tunnel includes a communications link established directly between a VPN client incorporated into a VoIP telephone and an Internet protocol private branch exchange (IP-PBX) network access point.

In a further embodiment, a network communication system is presented. The system includes a first interface to receive a signal at a network location from a remote VPN client disposed in a VoIP telephone unit. In addition, the VPN server includes a second interface to establish a secure connection with the remote VPN client, and an IP-PBX access point responsive to a VPN server. In another embodiment, the network communication system includes a local area network (LAN).

DESCRIPTION OF THE DRAWINGS(S)

The present disclosure is generally directed to a voice over Internet protocol (VoIP) telephone with an incorporated VPN client which provides for a communications link between the VoIP telephone and a remote location. This disclosure may be better understood with reference to FIGS. 1 through 6.

Figure 1:
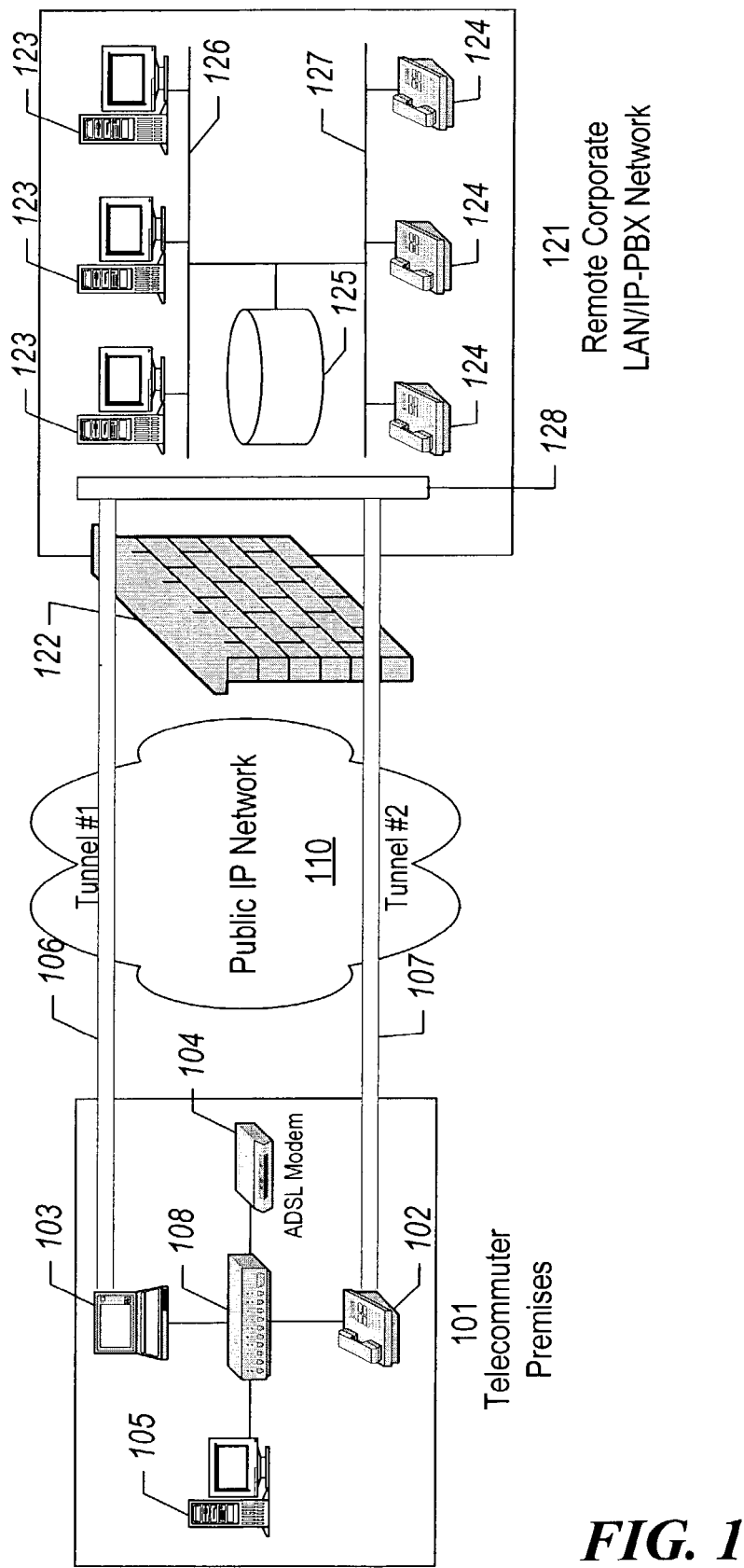
FIG. 1 is a general diagram illustrating a direct and secured communication link established between a VoIP telephone incorporated VPN client and a remote IP-PBX network access point.

FIG. 1 is a general diagram illustrating a direct and secured communication link established between a VoIP telephone incorporated VPN client and a remote IP-PBX network access point. In the example of FIG. 1, a VoIP telephone 102 located at telecommuter's premises 101 is connected to an EtherSwitch or hub 108. The EtherSwitch 108 also accommodates a personal computer (PC) 105, and a portable computer 103 to provide access to the public IP network 110.

EtherSwitch 108 includes logic to prioritize data transmission, for example, to prioritize VoIP data from VoIP telephone 102 over that of PC 105 or portable computer 103 data, as needed. EtherSwitch 108 is connected via a service line data connection to data switching equipment 104. The data switching equipment 104 is configured to communicate digital voice over Internet protocol data over a public Internet protocol network 110, such as the Internet. In a particular embodiment, the digital switching equipment 104 is a modem. The modem may be an asynchronous digital subscriber line (ADSL) modem, a digital subscriber line (DSL) modem, a cable modem, or other high-speed interface.

The combination of Etherswitch 108 and digital switching equipment 104 provide a gateway for communications to be received at and/or transmitted from the telecommuter premises 101. Gateways are so named because they are pieces of equipment which facilitate the passage of data to and from a network. In the example of FIG. 1, the gateway formed by the combination of Etherswitch 108 and digital switching equipment 104 is typically referred to as a residential gateway, as the equipment is located at telecommuter premises 101.

Two virtual private network tunnels, or secured (encrypted) data transmission corridors, labeled Tunnel #1 and Tunnel #2, are shown in FIG. 1. The VPN tunnels #1 and #2 transit public IP network 110 through a corporate firewall 122 to a VPN server 128 or concentrator at a remote location 121, such as corporate LAN 126 and/or IP-PBX network 127. The VPN tunnel #1 permits secured data transmission from the portable computer 103 VPN client at telecommuter premises 101 to the computers 123 and other servers 125 coupled to corporate LAN 126. When established, VPN tunnel #2 permits secured communications link by a direct and secured link between the VPN client incorporated into VoIP telephone 102 and the corporate location 121 IP-PBX network 127 access point. Tunnel #2 is one part of a network communication system that includes a first interface, e.g., VPN server 128, to receive a signal at a network location 121 from a remote VPN client disposed in VoIP telephone unit 102, and a second interface, e.g., the residential gateway in premises 101, to establish a secure connection with the remote VPN client in VoIP telephone unit 102.

Figure 2:
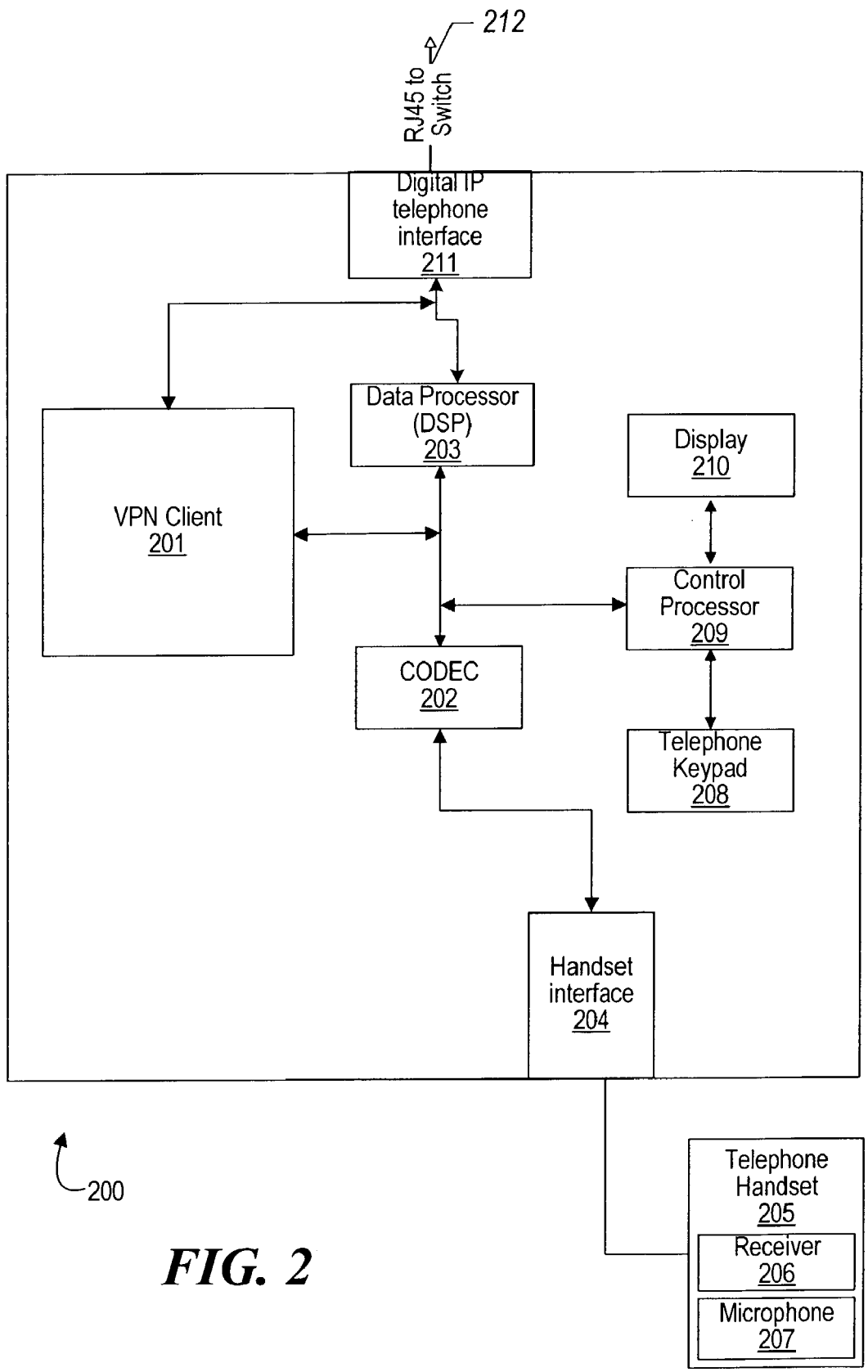
FIG. 2 is a block diagram illustrating an embodiment of a VoIP telephone unit with an incorporated VPN client module.

FIG. 2 is a block diagram illustrating an embodiment of a VoIP telephone unit 200 with an incorporated VPN client module 201 which permits the establishment of a direct and secured link between the VoIP telephone apparatus 200 over an RJ45 output 212 to a remote location. The VPN client module 201 includes a software client to facilitate the establishment of a VPN tunnel, e.g., VPN tunnel #2 in FIG. 1, between a VoIP telephone unit 200 and a remote network location such as IP-PBX network 127. There are various software clients which may be incorporated into VPN client module 201. For example, Check Point™ Software Technologies Ltd. VPN-1® SecureClient™, or Netlock Technologies, Inc.'s VPN client, e.g. Contivity, could be utilized in VPN client module 201. In addition to the VPN client module 201, the VoIP telephone unit 200 includes an encoder and decoder (codec) module 202 responsive to a dedicated VoIP telephone handset 205.

VoIP telephone unit 200 also includes a data processor 203, e.g., a digital signal processor, a keypad 208 responsive to user input, and a visual display window 210 responsive to the VPN client module 201, as well as being responsive to user input. An example of user input is a function key input from keypad 208 input. Display window 210 and keypad 208 are connected to a control processor 209. The control processor 209 provides processing for the typical user interaction functions of a telephone, for example, processing the inputs detected by keypad 208, displaying user information, such as dialed numbers or VPN session current status in display window 210, or providing an audible and visual indicator for outgoing or incoming calls. An example of a VPN client current status provided to the display window 210 is messaging information sent during the establishment of a VPN connection, e.g., establishing VPN session; VPN session in progress; concluding VPN session; VPN session concluded, or similarly informative messages. A handset interface 204 is connected to the dedicated VoIP telephone handset 205, which contains a receiver 206 and a microphone 207.

It will be appreciated that other components may be incorporated into the VoIP telephone 200 which are not specifically illustrated herein. Examples of other components include a serial interface to allow communication to a device to permit coordination of telephone information and to provide automatic dialing. Functions to perform VoIP voice processing, call processing, protocol processing, and network management software functions of a VoIP telephone may also be provided by the VoIP telephone 200.

Figure 3:
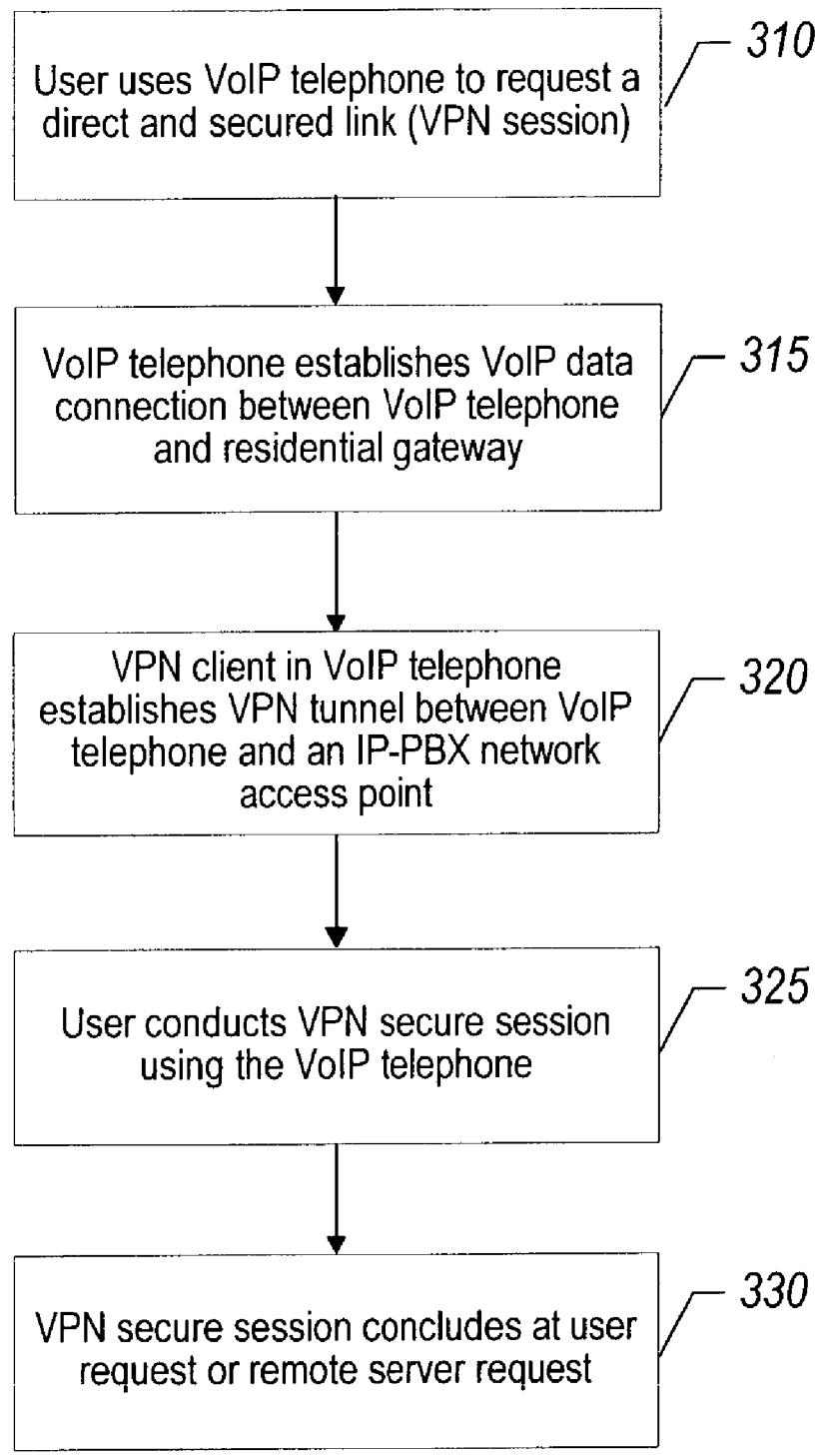
FIG. 3 is a flow diagram illustrating a method for establishing a VoIP telephone communication link.

An embodiment of a method for establishing a secured voice over Internet protocol (VoIP) telephone communication link is presented in the flow diagram of FIG. 3. In step 310, a user utilizes the VoIP telephone to request a direct and secured link, e.g., a VPN session to a remote location. A VoIP connection is established between a VoIP telephone and a gateway, at step 315. In a particular embodiment, the gateway is a residential gateway, such as that shown in telecommuter premises 101 of FIG. 1.

In step 320, the VPN client incorporated into the VoIP telephone establishes a VPN tunnel directly from the VoIP VPN client to an IP-PBX network access point at a remote location. The request to establish the VPN tunnel is initiated by a keypad entry or function key input by the user of the VoIP telephone. In step 325, the user conducts the VPN secure session using the VoIP telephone. During the VPN session, many secure VoIP telephone calls may be made to telephones located at the other end of the VPN tunnel (the remote location) over the course of the session. When the VPN secure session is no longer required, the user can, in step 330, request to conclude the VPN session. In a particular embodiment, the request to conclude the session is in response to a keypad input from the user, e.g., a function key, or series of numbers/characters entered by a user with the keypad. A request to conclude the VPN session may also be transmitted in response to a message received from the remote VPN server.

Figure 4:
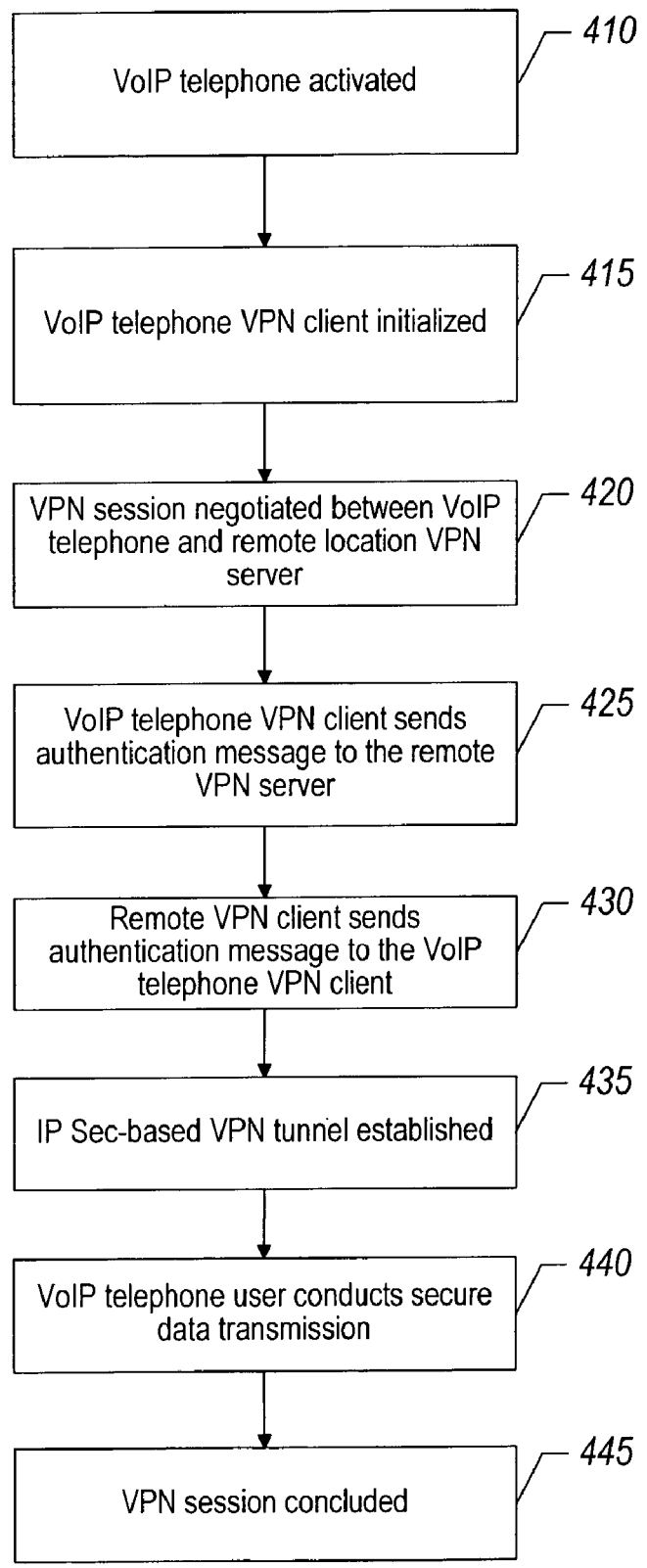
FIG. 4 is a flow diagram illustrating a method for establishing a communication link using a VPN client within a VoIP telephone apparatus.

FIG. 4 is a flow diagram illustrating a method for establishing a secured communication link using a VPN client within a VoIP telephone apparatus. In step 410, the VoIP telephone is activated. Activation includes powering on the VoIP telephone and insuring that a VoIP connection with the gateway has been established, that is, that the VoIP telephone is working. In step 415, the VPN client within the VoIP telephone is initialized. Initialization includes configuring the VPN client with appropriate information, e.g., login parameters such as IP address, password, and the like. Generally this information will only have to be entered by the user, service provider, or automatically detected by the VPN client during the first initialization, and is then stored in the processor memory of the VPN client module. In subsequent initializations, the information can be retrieved from the VPN client module's memory.

Following initialization, the VoIP telephone VPN client negotiates a VPN session between the VoIP telephone VPN client and a VPN server at a remote location. In an illustrative embodiment, this negotiation includes steps 425, 430, and 435. In step 425, a first authentication session is sent by the VoIP telephone VPN client to the remote VPN server. In step 430, the VoIP telephone VPN client receives, in response to sending the first authentication message, a second authentication message from the remote VPN server. When these authentication message 'handshakes' have occurred, secure data communication, i.e., an IPSec-based VPN tunnel is established, as in step 435. These 'handshakes' continue throughout the duration of the VPN session. In a particular embodiment, the secure data communication provides a voice communication path. In another embodiment, the secure data communication is a facsimile transmission.

In step 440, the VoIP telephone user utilizes the VPN tunnel to conduct a secured VPN session between the VoIP telephone and the VPN server at the remote location. Once established, multiple secured telephone or facsimile transmissions can be made over the tunnel to various telephones or facsimile machines at the remote IP-PBX network. Simply replacing the handset in the VoIP telephone cradle does not conclude the VPN session. When a user desires to conclude the VPN session, a request is made by the user to conclude the VPN session. In a particular embodiment, the VPN session is concluded in step 445 in response to user input at the VoIP telephone, for example, where a user presses a function key or other keys on the VoIP telephone keypad. In a further embodiment, the VPN session may be concluded in response to a message received at the VoIP telephone VPN client from the remote VPN server.

Figure 5:
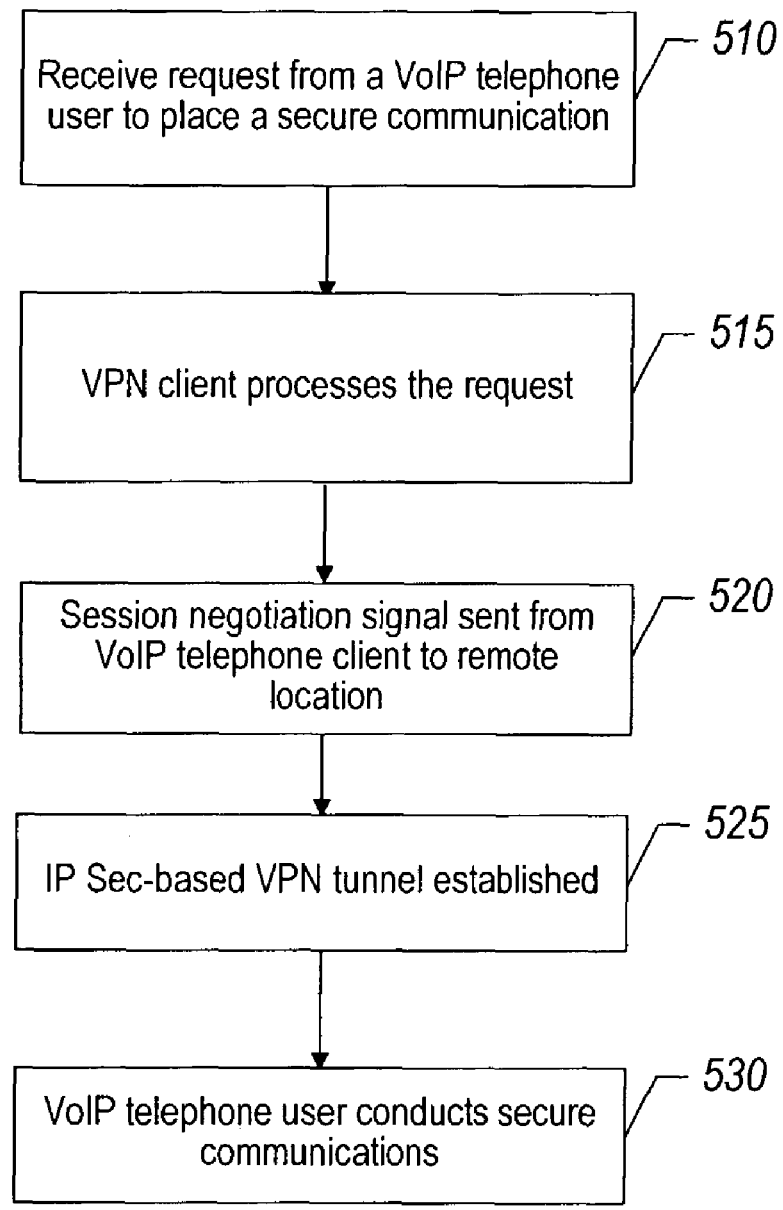
FIG. 5 is a flow diagram illustrating a method for establishing a VoIP telephone communication link.

FIG. 5 is a flow diagram illustrating a method for establishing a secured VoIP telephone communication link. In step 510, a request is received from a user of a VoIP telephone unit having an internal VPN client to place a secure communication. In a particular embodiment, the request is made by user input to a keypad on the VoIP telephone unit. In step 515, the VPN client in the VoIP telephone processes the request. A session negotiation signal is sent from the VoIP telephone unit's internal VPN client over a data interface to a VPN server at a remote location, in step 520. In an illustrative embodiment, the internal VPN client is an IPSec-based client, in accordance with RFC 2401. Successful negotiation results in the establishment of a VPN secure session in step 525, in response to the request to place a secure telephone call of step 510. The VoIP telephone user may then conduct secure communications, at step 530.

Figure 6:
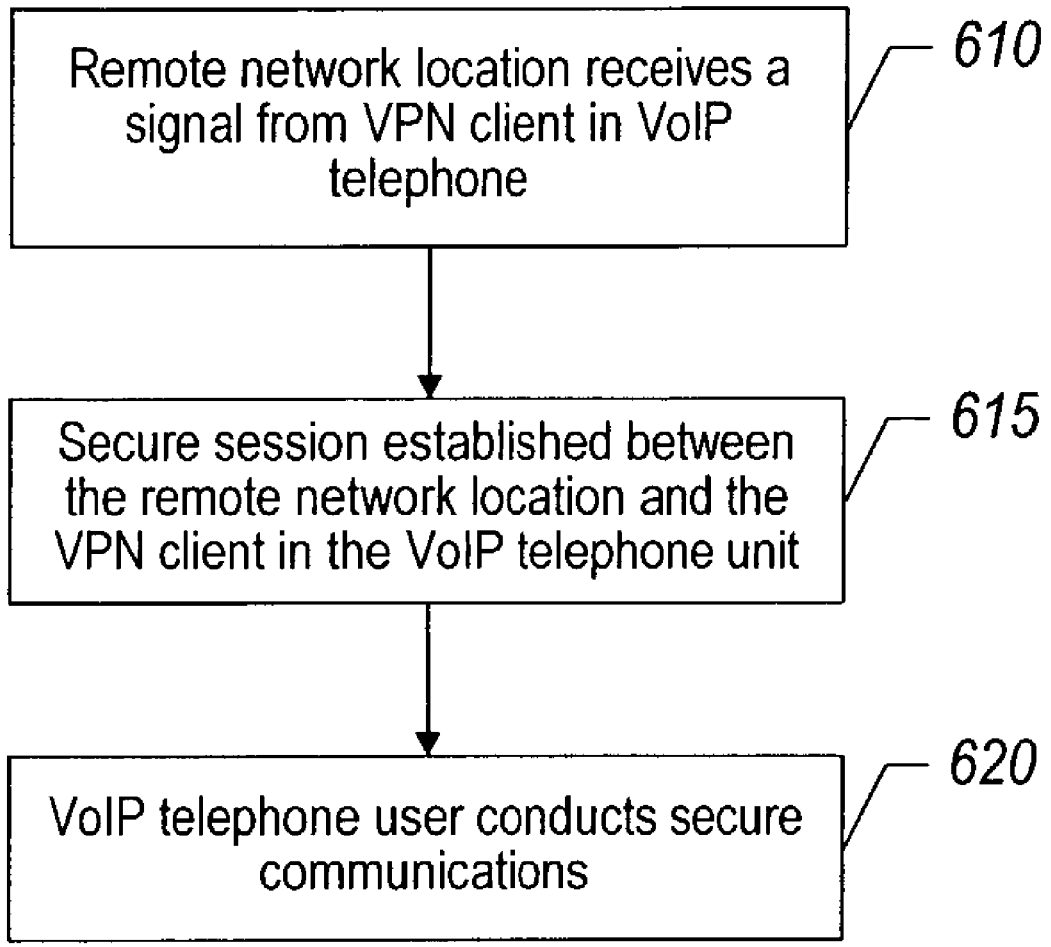
FIG. 6 is a flow diagram illustrating a method of communicating between a remote network location and a VoIP telephone unit.

FIG. 6 is a flow diagram illustrating a method of communicating between a remote network location and a VoIP telephone unit. In step 610, a signal is received at a remote network location from a VPN client of the VoIP telephone unit. In step 615, a secure connection between a VPN server in the remote network location and the VPN client in the VoIP telephone unit is established in response to receiving the signal. In step 625, the VoIP telephone user conducts secure communications.

The VoIP telephone as described may offer advantages to the mobile employee who chooses to bring the VoIP telephone with internal VPN client from work to home, or when travelling. When using a VoIP telephone from home or from a hotel, the mobile employee in this case no longer has to rely on a corporate phone card or personal expense for long-distance calls, as long as broadband access is available. Moreover, in addition to the cost savings on long distance calls, the VoIP telephone can establish a VPN tunnel between the VoIP telephone VPN client and the employer's corporate LAN for secured (encrypted) voice communications and facsimile transmissions.

The method and apparatus described herein provides for a flexible implementation. Although the invention has been described using certain specific examples, it will be apparent to those skilled in the art that the invention is not limited to these few examples. Additionally, various types of Voice over Internet Protocol (VoIP) telephones and VPN client software are currently available which could be suitable for use in direct and secured VoIP communications when employing the method and apparatus as taught herein. The above-disclosed subject matter is to be considered illustrative, and not restrictive and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for establishing a Voice over Internet Protocol (VoIP) telephone communication link, the method comprising:
   receiving, at a VoIP telephone, a request to initialize a virtual private network (VPN) session, wherein the VoIP telephone comprises a dedicated hardware telephone device, and wherein the request is received via a user selection of a function key of a keypad incorporated into the VoIP telephone;
   initializing an IP Security (IPSec) based VPN client module incorporated into the VoIP telephone in response to the user selection of the function key of the keypad incorporated into the VoIP telephone, wherein initializing the IPSec based VPN client module includes retrieving VPN login parameters from a memory of the VoIP telephone, wherein the VPN login parameters include at least an IP address and a password to establish the VPN session;
   displaying, at a visual display window incorporated into the VoIP telephone, a first indication that the VPN session is being established upon initialization of the IPSec based VPN client module;

establishing a VPN tunnel from the VoIP telephone to an Internet protocol private branch exchange (IP-PBX) network access point based on the VPN login parameters retrieved from the memory of the VoIP telephone, wherein the VPN tunnel is established over an RJ45 interface incorporated into the VoIP telephone, the RJ45 interface directly coupled to a gateway that facilitates communication between the VoIP telephone and the IP-PBX network access point; and displaying, at the visual display window incorporated into the VoIP telephone, a second indication that the VPN session is in progress upon establishment of the VPN tunnel.

2. The method of claim 1, further comprising receiving the VPN login parameters via a keypad input of the VoIP telephone and storing the VPN login parameters at the memory before initialization of the VPN client module.

3. The method of claim 1, further comprising:
placing a first call to a first destination via the VPN session using the VoIP telephone after establishment of the VPN tunnel;
terminating the first call after a handset of the VoIP telephone is placed in a cradle of the VoIP telephone;
displaying, at the visual display window incorporated into the VoIP telephone, the second indication that the VPN session is in progress;
placing a second call to a second destination via the VPN session using the VoIP telephone;
terminating the second call after the handset of the VoIP telephone is placed in the cradle of the VoIP telephone;
displaying, at the visual display window of the VoIP telephone, the second indication that the VPN session is in progress;
after the first call and the second call have been terminated, concluding the VPN session; and
displaying, at the visual display window of the VoIP telephone, a third indication that the VPN session has concluded.

4. The method of claim 1, wherein the VPN session is terminated in response to an instruction received from a remote network device.

5. A Voice over Internet Protocol (VoIP) telephone apparatus comprising:
a telephone housing;
an RJ45 interface incorporated into the telephone housing, wherein the RJ45 interface is operable to directly couple the VoIP telephone apparatus to a gateway that facilitates communication with a remote virtual private network (VPN) server;
a keypad incorporated into the telephone housing, the keypad responsive to user input;
a dedicated telephone handset coupled to the telephone housing;
an encoder and decoder module responsive to the dedicated telephone handset, wherein the encoder and decoder module is within the telephone housing;
a memory within the telephone housing, the memory configured to store VPN login parameters that include at least an IP address and a password to establish a VPN session with the remote VPN server;
a data processor responsive to the encoder and decoder module, wherein the data processor is within the telephone housing;
an IP Security based VPN client module within the telephone housing responsive to the data processor to retrieve the VPN login parameters from the memory in response to a user selection of a function key of the keypad and to initialize the VPN session with the remote VPN server based on the VPN login parameters; and
a visual display window incorporated into the telephone housing, the visual display window responsive to the IPSec based VPN client module and responsive to user input via the keypad, wherein the visual display window displays a status of the VPN session;
wherein a transmission of VoIP data from the VoIP telephone apparatus via the gateway during the VPN session has higher priority than a transmission of data from a personal computer to a public IP network via the gateway.

6. The VoIP telephone apparatus of claim 5, wherein the status indicates that the VPN session is being established in response to the IPSec based VPN client module initializing the VPN session.

7. The VoIP telephone apparatus of claim 5, wherein the status indicates that the VPN session is in progress upon establishment of a VPN tunnel from the VoIP telephone apparatus to the remote VPN server over the RJ45 interface via the gateway.

8. The VoIP telephone apparatus of claim 5, wherein the status indicates that the VPN session is being concluded.

9. The VoIP telephone apparatus of claim 5, wherein the status indicates that the VPN session has concluded.

10. A method for establishing a Voice over Internet Protocol (VoIP) telephone communication link, the method comprising:
activating a VoIP telephone, wherein the VoIP telephone comprises a dedicated hardware telephone device, and wherein the VoIP telephone comprises a telephone housing, a keypad incorporated into the telephone housing and a visual display window incorporated into the telephone housing;
initializing an IP Security (IPSec) based VPN client module within the telephone housing of the VoIP telephone in response to a user selection of a function key of the keypad incorporated into the VoIP telephone, wherein initializing the IPSec based VPN client module includes retrieving VPN login parameters from a memory of the VoIP telephone, wherein the VPN login parameters include at least an IP address and a password to establish a VPN session;
displaying, at the visual display window incorporated into the housing of the VoIP telephone, a first indication that a VPN session is being established upon initialization of the IPSec based VPN client module;
sending a first authentication message from the VPN client module of the VoIP telephone to a VPN server at a remote location, wherein the first authentication message includes the VPN login parameters;
receiving, at the VPN client module of the VoIP telephone, a second authentication message from the VPN server at the remote location;
establishing a VPN tunnel from the VoIP telephone to the VPN server at the remote location in response to receiving the second authentication message, wherein the VPN tunnel is established over an RJ45 interface incorporated into the VoIP telephone, the RJ45 interface directly coupled to a gateway that facilitates communication between the VoIP telephone and the VPN server at the remote location; and
displaying, at the visual display window incorporated into the housing of the VoIP telephone, a second indication that the VPN session is in progress upon establishment of the VPN tunnel.

11. The method of claim 10, wherein the telephone housing comprises a base and a handset operable to conduct a VoIP telephone call via the VPN session, wherein when the handset is placed in a cradle of the base, the VoIP telephone call is concluded, but the VPN session is not concluded.

12. A method for establishing a Voice over Internet Protocol (VoIP) telephone communication link, the method comprising:

receiving a request from a user of a VoIP telephone unit having a telephone housing, and an IP Security (IPSec) based virtual private network (VPN) client within the telephone housing to place a secure telephone call, wherein the VoIP telephone comprises a dedicated hardware telephone device, and wherein the request is received from the user via a user selection of a function key of a keypad incorporated into the telephone housing;

sending a signal from the VoIP telephone unit over an RJ45 interface incorporated into the telephone housing to a remote location, the RJ45 interface directly coupled to a gateway that facilitates communication between the VoIP telephone unit and the remote location;

displaying, at a visual display window incorporated into the telephone housing of the VoIP telephone, a first indication that a VPN session is being established upon sending the signal;

establishing the VPN session with a VPN server at the remote location over the RJ45 interface;

displaying, at the visual display window incorporated into the VoIP telephone, a second indication that the VPN session is in progress upon establishment of the VPN session; and making a plurality of calls to a plurality of destinations via the VPN session;

wherein a transmission of VoIP data from the VoIP telephone unit via the gateway during the VPN session has higher priority than a transmission of data from a personal computer to a public IP network via the gateway.

13. The method of claim 12, further comprising concluding the VPN session in response to user input to conclude the VPN session.

14. The method of claim 12, wherein the VPN session is not terminated when a call is terminated.

15. The method of claim 12, further comprising:

displaying, at the visual display window incorporated into the telephone housing of the VoIP telephone, a third indication that the VPN session is being concluded;

concluding the VPN session between the VoIP telephone and the VPN server at the remote location; and displaying, at the visual display window incorporated into the housing of the VoIP telephone, a fourth indication that the VPN session has concluded.

* * * * *